United States Patent [19]

Kessels et al.

[11] Patent Number: 4,800,547
[45] Date of Patent: Jan. 24, 1989

[54] OPTICAL RECORD CARRIER SCANNING APPARATUS WITH SCANNING BEAM FOCUS ERROR DETECTION

[75] Inventors: Henricus M. M. Kessels; Christiaan H. F. Velzel, both of Eindhoven, Netherlands

[73] Assignee: U.S. Philips Corporation, New York, N.Y.

[21] Appl. No.: 939,205

[22] Filed: Dec. 8, 1986

[30] Foreign Application Priority Data

Jul. 18, 1986 [NL] Netherlands .......................... 8601876

[51] Int. Cl.4 .............................................. G11B 7/00
[52] U.S. Cl. ...................................... 369/45; 369/109; 369/122; 350/3.71; 250/237 G
[58] Field of Search ...................................... 369/44–46, 369/109, 112, 120; 350/162.17, 162.2, 3.71; 250/237 G

[56] References Cited

U.S. PATENT DOCUMENTS

| | | | |
|---|---|---|---|
| 3,833,769 | 9/1974 | Compaan et al. ...................... | 369/45 |
| 4,358,200 | 11/1982 | Heamskeik et al. ............ | 369/109 X |
| 4,428,643 | 1/1984 | Kay ................................... | 350/3.71 |
| 4,532,522 | 7/1985 | Tsunoda et al. ................... | 360/77 X |

Primary Examiner—Aristotelis M. Psitos
Attorney, Agent, or Firm—Algy Tamoshunas

[57] ABSTRACT

Apparatus for scanning the information surface of an optical disc record carrier with a radiation beam. Errors in beam focus on such surface are detected by providing two optical gratings in succession in the path of the radiation reflected from the record carrier. The gratings have a constant grating period, which may be equal or in a fixed ratio, the directions of the grating strips of the two gratings intersecting each other at a relatively small angle, thereby forming a Moire interference pattern in the radiation emergent from the two gratings which rotates due to changes in beam focus. This changes the relative amounts of radiation received by an assembly of radiation detecting elements adjacent the second grating, producing a focus error control signal which can be employed for correcting beam focus.

7 Claims, 2 Drawing Sheets

OPTICAL RECORD CARRIER SCANNING APPARATUS WITH SCANNING BEAM FOCUS ERROR DETECTION

BACKGROUND OF THE INVENTION

1. Field of the Invention

The invention relates to an apparatus for scanning an information surface of an optical record carrier, which apparatus comprises a radiation source, an objective system for focussing a radiation beam produced by the source so as to form a radiation spot on the information surface, and a focus-error detection system for determining a deviation between the plane of focussing of the objective system and the information surface.

The phrase "scanning information" is to be understood to mean both scanning an inscribed information surface with a read beam and scanning for the purpose of recording information in said surface by means of a radiation beam whose intensity is modulated in conformity with the information to be recorded.

2. Description of the Related Art

Apparatuses for optically recording and/or reading optical record carriers have been described frequently in the literature and in patent documents. By way of example reference is made to U.S. Pat. No. 4,358,200, which relates to a read apparatus.

In order to obtain an adequate information-storage capacity, the details of the information structure in optical record carriers must have very small dimensions, of the order of micrometres, and the scanning spot should be correspondingly small. In order to form such a minute scanning spot an objective system with a comparatively large numerical aperture must be used, which objective system has a small depth of focus, of the order of 10 micrometres. Vibrations in the apparatus or wobbling motions of the record carrier may give rise to deviations between the plane of focussing of the objective system and the information surface, also referred to as focus errors, which are larger than the depth of focus, thus inhibiting a correct recording or reading process. During scanning it is therefore necessary to detect said deviations to enable the focussing to be corrected accordingly by, for example, moving the objective system.

The apparatus described in U.S. Pat. No. 4,358,200 therefore comprises a diffraction grating with a linearly varying grating period arranged in the radiation path of the scanning beam, by means of which the reflected beam which originates from the record carrier and which traverses the grating is made astigmatic. A radiation-sensitive detection system comprising four detectors is arranged between the astigmatic focal lines of this beam. In the case of a variation of the position of the information surface relative to the objective system the shape of the radiation spot formed on the detection system will change. This change in shape can be detected by combining the output signals of the detectors in the appropriate manner.

The known apparatus requires the use of a special grating. As this grating is arranged both in the path of the projected beam and in the path of the reflected beam, only a part of the radiation emitted by the source can be utilized. Moreover, very stringent requirements are imposed on the positional accuracy of the various components, in particular the detector. Finally, the overall pathlength of the beam, from the source to the detector, is comparatively large.

SUMMARY OF THE INVENTION

It is the object of the present invention to mitigate these drawbacks and to provide a scanning apparatus which employs another principle of focus-error detection. This apparatus is characterized in that the focus-error detection system comprises two diffraction gratings having a constant grating period arranged one behind the other in the path of the beam from the record carrier, the grating period of the second grating being equal to that of the first grating multiplied by a factor which is determined by the beam divergence. The planes of the gratings extend parallel to each other and the grating strips of the second grating intersect those of the first grating at a small angle. The apparatus also includes a composite radiation-sensitive detection system, and the angle which the coordinate axes of this system make with the interference pattern formed at the location of the system depends on the deviation between the plane of focussing of the objective system and the information surface.

In this respect a small angle is to be understood to mean an angle of the order of a few degrees. The term beam divergence is to be understood to mean either positive or negative beam divergence, the latter being beam convergence. For a diverging beam the grating period of the second grating is larger than that of the first grating, and for a converging beam this is the other way round. In the case of a parallel beam the two gratings have equal grating periods.

The gratings form a plurality of sub-beams which interfere with each other. At the location of the detection system this results in a pattern of dark and bright bands, referred to as Moiré pattern, which may be regarded as the superposition of the shadow images of the two gratings. The orientation of these bands varies with a focussing error. When the individual detectors of the radiation-sensitive detection system are suitably oriented and the output signals of these detectors are suitably processed, this enables the magnitude and the sign of the focus-error signal to be derived from the orientation of the interference bands.

The periods of the gratings, the distance between the gratings, and the position of the detection system may be selected in such a way that only sub-beams of specific diffraction orders interfere with each other in the plane of the detection system.

However, suitably the apparatus in accordance with the invention is characterized further in that the second grating is arranged in a Talbot image of the first grating. This has the advantage that a maximum number of diffraction orders contribute to the formation of the interference pattern, so that the amount of radiation received by the detection system is maximal.

As is described in the article "Measurement of Phase Objects using the Talbot effect and Moire techniques" published in "Applied Optics", Vol. 23 (1984), pages 2296–2299, Talbot images of a grating having a period p and illuminated with a monochromatic plane wave are formed at distances $Z_k$ from the grating, where $Z_k = 2 \cdot k \cdot p^2 / \lambda$, in which k is an integer and $\lambda$ is the wavelength of the radiation used. At the location for which $k=1$, the first Talbot image is formed.

It is to be noted that the apparatus described in said article employs a first grating and a second grating arranged in the Talbot image of the first grating, for measuring the focal length of a lens. However, the known apparatus is not employed for determing a deviation between the plane of focussing of a lens system and a reflecting surface. The interference pattern formed by the two gratings is projected onto a frosted-glass screen for visual display and the angular orientation of this pattern is not measured by means of a composite radiation-sensitive detection system. Said article does not reveal the insight on which the present invention is based, that a system comprising two gratings, which can be made cheaply in large quantities by means of replica techniques, is very suitable for use in a mass-manufactured product such as an apparatus for reading and/or inscribing an optical record carrier.

An optimum use of the radiation-sensitive detection system is achieved in a read and/or write apparatus which is characterized further in that only one band of the interference pattern is situated on the entire radiation-sensitive area of the detection system. The period of the interference pattern, and hence the width of an interference band, depends on the angle between the grating strips of the two gratings and the distance between the second grating and the radiation-sensitive detection system. If only one band of the interference pattern is situated on the detection system the focus-error detection system will exhibit a high sensitivity. Moreover, the detection system may be utilized for supplying a tracking signal and, in the case that a pre-recorded record carrier is read, for suppyling an information signal.

In order to minimize crosstalk between the tracking signal and the focus-error signal the apparatus is suitably characterized further in that one bright band of the interference pattern is situated on the detection system.

An advantage of the apparatus in accordance with the invention is that the detection system can be arranged close to the second grating, enabling the length of the radiation path to be reduced. Another embodiment of the invention is therefore characterized further in that the second grating is arranged against the radiation-sensitive detection system.

A further embodiment of the invention is characterized in that the radiation-sensitive detection system is constructed as a grating-shaped detection system. This embodiment minimizes the number of components and also minimizes the number of alignment steps during assembly.

BRIEF DESCRIPTION OF THE DRAWINGS

Embodiments of the invention will now be described in more detail, by way of example, with reference to the accompanying drawings. In the drawings.

DESCRIPTION OF THE PREFERRED EMBODIMENTS

Figure 1:
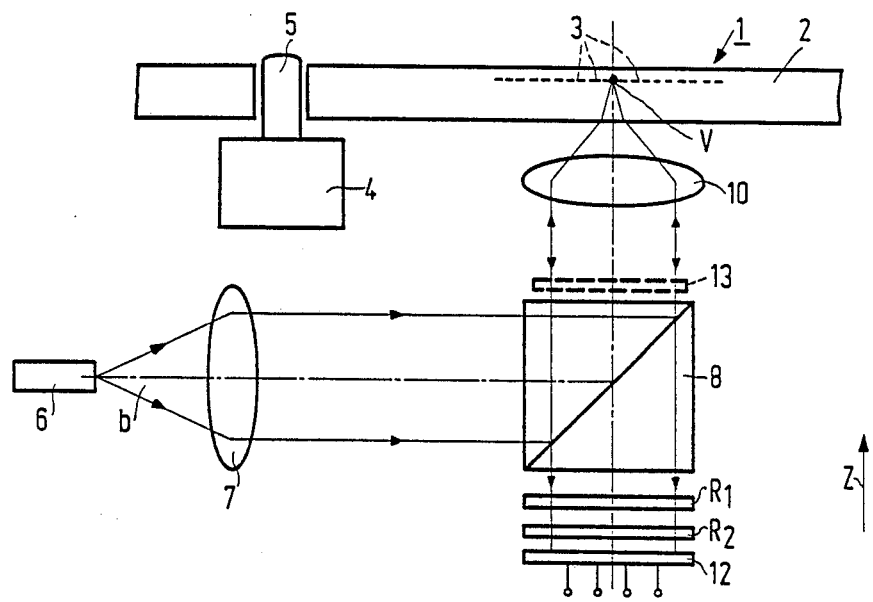
FIG. 1 shows a scanning apparatus comprising the novel focus-error detection system.

FIG. 1 shows a round disc-shaped record carrier 1 in a radial sectional view. The information structure is represented by information tracks 3 in a reflecting information surface 2. The information tracks comprise a multitude of information areas, not shown, for example pits, which alternate with intermediate areas in the track direction. The record carrier is illuminated by a read beam b issuing from a radiation source 6, for example a semiconductor-diode laser, such as an A1GaAs-laser. A part of the beam b is reflected to the record carrier by a beam splitter 8. An objective system 10, which for simplicity is represented as a single lens, focusses the read beam b so as to form a read spot V in the information plane 2. A collimator lens 7 is arranged between the radiation source and the beam splitter 8 to convert the diverging beam into a parallel beam of such a cross-section that the pupil of the objective system is filled adequately, thereby ensuring that the read spot V has minimal dimensions. The read beam is reflected from the information surface 2 and, as the record carrier is rotated by means of a shaft 5 driven by a motor 4, it is modulated in conformity with the information stored in a track to be read. A part of the modulated beam is transmitted to a radiation-sensitive detection system 12, which converts this beam into an electric signal which is representative of the information being read.

The beam splitter may comprise a semitransparent mirror or a semitransparent splitter prism. In order to minimise radiation losses the beam splitter suitably comprises a polarisation-sensitive splitter prism. In that case a $\lambda/4$ plate 13, wherein $\lambda$ is the wavelength of the beam, is arranged in the radiation path between the splitter prism and the record carrier. This plate is traversed twice by the beam b, so that the direction of polarisation of this beam is rotated through 90° in total and the beam, which the first time is almost fully reflected by the prism 8, is almost wholly transmitted after reflection from the record carrier.

In order to enable deviations between the plane of focussing of the objective system 10 and the information surface 2 to be detected, two gratings, $R_1$ and $R_2$, are arranged between the beam splitter 8 and the radiation-sensitive direction system 12. In the present case of a parallel beam b these gratings have the same grating period. The grating strips of one grating intersect those of the other grating at a small angle $\theta$.

Figure 2:
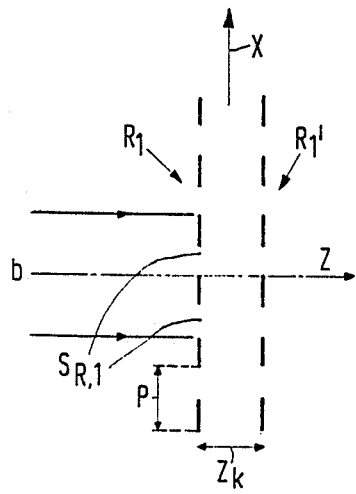
FIG. 2 is a sectional view of a diffraction grating and a Talbot image thereof.

FIG. 2 is a cross-sectional view of the first grating $R_1$. In this Figure Z is the direction of the optical axis. The grating strips $S_{R,1}$ extend perpendicularly to the plane of drawing, i.e. in the Y-direction, whereas the X-direction is the direction of the periodic amplitude or phase variation of the grating. If this grating is illuminated with a monochromatic beam having a plane wavefront, a Talbot image of the grating is formed at a distance $Z_k$, given by $Z_k = 2 \cdot k \cdot p^2 / \lambda$, from the grating, where k is an integer, in the present case 1, p is the grating period, and $\lambda$ is the wavelength of the incident beam. In FIG. 2 this image is indicated by $R_{1'}$, and has the same period as the grating $R_1$ if the incident beam is parallel.

Figure 3:
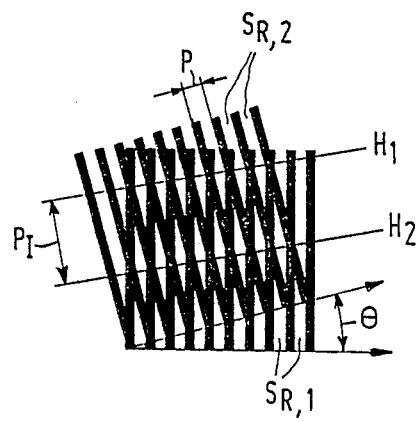
FIG. 3 shows the interference pattern of two gratings which are imaged onto each other and whose grating strips are inclined relative to each other.

At the location of the grating image $R_1'$ a second grating $R_2$ is arranged, which has the same grating period as the grating $R_1$ but whose grating strips are rotated through a small angle $\theta$ relative to those of the grating $R_1$. This results in an interference or Moiré pattern of bright and dark bands being formed behing the grating $R_2$. FIG. 3 is a plan view of the pattern of the two gratings $R_1$ and $R_2$. The period $P_I$ and the direction of periodicity of the Moire pattern depend on the angle $\theta$ and on the period of the gratings. In this Figure $H_1$ and $H_2$ denote the centre axes of the bright bands.

Figure 4A:
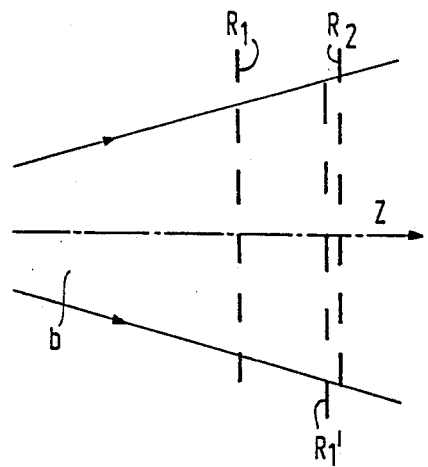
FIGS. 4a and 4b show the magnified image of the first grating in the case of a diverging beam and the reduced image of this grating in the case of a converging beam.
Figure 4B:
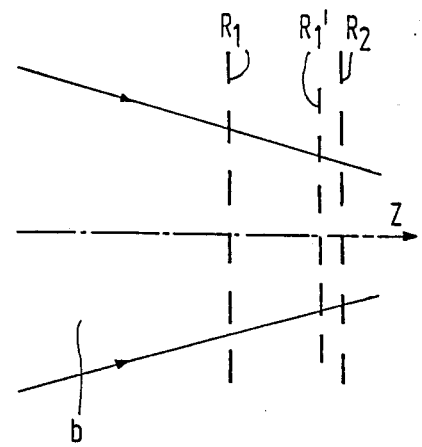

As long as the information surface 2 coincides with the plane of focussing of the objective system 10 the beam coming from the record carrier after having passed the objective system is a parallel beam, which is perpendicularly incident on the grating $R_1$. The direction of the bands of the Moire pattern formed behind the grating $R_2$ is then determined by the fixed angle $\theta$ between the grating strips of the gratings $R_1$ and $R_2$. If there is a deviation between the information surface 2 and the plane of focussing of the objective system, the beam which is incident on the grating $R_1$ is no longer parallel but converges if the distance between the surface 2 and the objective system is too large, or it diverges if this distance is too small. A diverging beam b incident on the grating $R_1$ forms a magnified image of this grating on the grating $R_2$, as is schematically indicated in FIG. 4a. The magnification occurs mainly at the edges of the gratings. This means that the Moiré pattern is rotated in a specific direction, because the two edges of this pattern have moved in opposite directions, whilst the centre of the pattern has remained in place. If a converging beam is incident on the grating $R_1$ a reduced image is formed, as is shown schematically in FIG. 4b. The Moiré pattern is then rotated again, but in a direction opposite to that in which the pattern is rotated in the case of a diverging beam. Thus, the magnitude and direction of the rotation of the Moiré pattern is dictated by the magnitude and the sign of the deviation between the information surface 2 and the plane of focussing of the objective system.

The rotation of the Moiré pattern can be measured by means of a composite radiation-sensitive detection system 12 comprising a plurality of separate detectors. The number of detectors and their position relative to each other are adapted to the interference pattern, in particular to the number of Moiré bands across the surface of the detection system and to the orientation of these bands in the case of a correct focussing of the beam b on the information surface. The period of the Moiré pattern depends on the angle $\theta$ between the gratings $R_1$ and $R_2$ and on the distance between these gratings. Suitably, these parameters are selected in such a way that only one bright band of the Moire pattern extend across the detection system. In principle, the rotation of the Moire pattern can be detected by means of two detectors.

Figure 5:
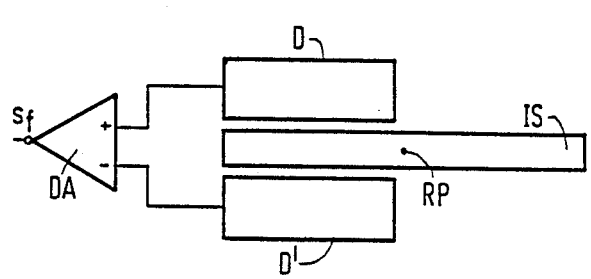
FIG. 5 shows the radiation-sensitive detection system in the first embodiment.

In FIG. 5 these detectors are denoted by D and D'. These detectors have a length which is at the most equal to half the length of the Moiré band IS. In the case of a focussing error in the optical scanning apparatus this band is rotated clockwise or anti-clockwise about the point $R_p$ depending on the sign of the focussing error, so that either the detector D receives more radiation than the detector D' or the detector D receives less radiation than the detector D'. Subtracting the output signals of the detectors D and D' from each other in a differential amplifier DA provides the focus-error signal $S_f$.

Figure 6:
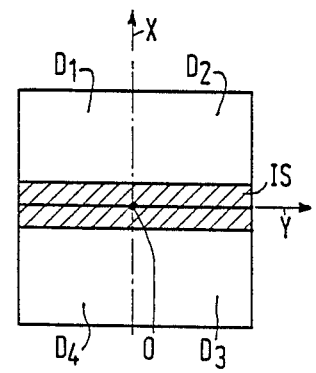
FIG. 6 shows such a system in the second embodiment and FIG. 7 shows two gratings which may be used in a further embodiment of the invention and the diffraction orders formed by these gratings.

Preferably, use is made of a four-quadrant detector as shown in FIG. 6. This detector comprises four separate detector sections situated in the different quadrants of the X-Y coordinate system. The origin O of this system is situated on the X-axis. If the output signals of the detector sections $D_1$, $D_2$, $D_3$ and $D_4$ are $S_1$, $S_2$, $S_3$ and $S_4$, the focus error signal $S_f$ is given by:

$$S_f = (S_1 + S_3) - (S_2 + S_4)$$

In comparison with a detection system comprising two separate detectors a four-quadrant detector has the advantage of a higher signal-to-noise ratio. Moreover, both the information to be read and the tracking signal can now be derived by the same detector during scanning of the record carrier. The manner in which this is effected is known per se, for example from U.S. Pat. No. 4,358,200 and is therefore not described herein. The information signal $S_I$ and the tracking signal $S_r$ are given by:

$$S_I = S_1 + S_2 + S_3 + S_4$$

$$S_r = (S_1 + S_2) - (S_3 + S_4)$$

if the orientation of the Moiré bands coincides with the direction of an information-track portion being scanned.

In a practical embodiment of the invention, in which the second grating is arranged in the Talbot image of the first grating, the grating period of the two gratings is approximately 40 $\mu$m and the distance between these gratings is approximately 2 mm. The angle $\theta$ between the strips of the two gratings is approximately 1°. On the detection system one bright Moiré band is formed. The lock-in range of the focus-error detection system is approximately 200 $\mu$m in total.

Instead of a bright band a dark band of the Moiré pattern may be situated on the detection system 12. However, it has been found that in the situation in which a bright band is formed on the detection system the cross-talk between the tracking signal $S_r$ and the focus-error signal $S_f$ is substantially smaller.

In the apparatus shown in FIG. 1 the detection system is situated close to the second grating, so that the apparatus is compact. The second grating $R_2$ may be secured to the detection system, so that no separate holder for this grating is required and this grating and the detection system cannot vibrate relative to each other. In a suitable embodiment of the apparatus the second grating is integrated in the detection system 12. This system then comprises two or four separate detector sections which each comprise radiation-sensitive strips alternating with radiation-insensitive strips. The apparatus then comprises only one separate grating, $R_1$, which may be secured to the beam splitter 8.

If desired, the detection system 12 may be arranged at a larger distance from the gratings $R_1$ and $R_2$. The Moiré pattern can then be imaged on the detection system by a lens arranged between the grating $R_2$ and the detection system.

The embodiment in which the second grating is arranged in the Talbot image of the first grating is advantageous, because then an optimum use is made of the radiation returning from the record carrier. However, it is also possible to arrange the two gratings at a larger distance from each other and to use only some of the diffraction orders formed by the gratings in order to detect a focus-error signal. This possibility is illustrated schematically in FIG. 7. The grating $R_1$ splits the beam b which is incident on this grating into a plurality of sub-beams of different diffraction orders, of which only the zero-order sub-beam b(0) and the two first-order sub-beams b(+1) and b(−1) are shown. The second grating $R_2$ splits each of these sub-beams into a plurality of diffraction orders indicated by the second indices in FIG. 7. Depending on the period of the gratings and the distance between these gratings sets of sub-beams such as b(0,+1), and b(+1,0), or b(0,−1) and b(−1,0), or b(+1,−1), b(0,0) and b(−1,+1) may be distinguised in a specific plane $P_L$, each set forming an interference pattern. At the location of such a pattern the detection system shown in FIG. 5 or 6 may be arranged. The orientation of the bands of the interference pattern again depends on the distance between the objective system 10 and the information surface 2.

Figure 7:
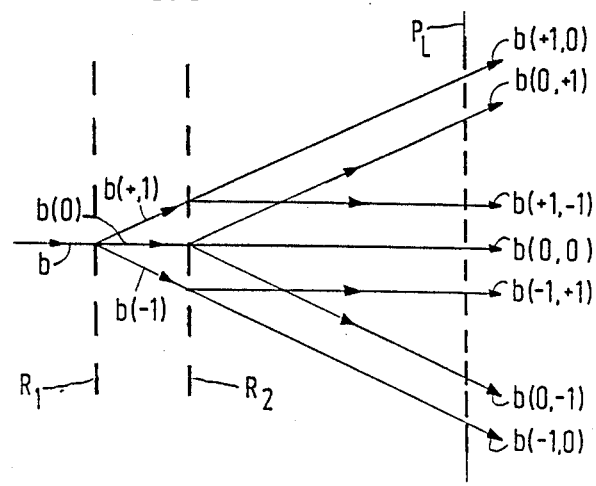

It is to be noted that FIG. 7 only shows the chief rays of the beam b and of the sub-beams. In reality, each of the sub-beams has a width equal to that of the incident beam b.

The gratings $R_1$ and $R_2$ may be amplitude gratings which comprise radiation-transmitting strips alternating with radiation-absorbing or radiation-reflecting strips. However, preferably use is made of transparent phase gratings whose adjacent strips differ from each other in that they are situated at different levels or in that they have different refractive indices. Profiled phase gratings can be manufactured cheaply in large quantities using known replica techniques once a master phase-grating is available, so that these gratings are very suitable for use in a mass-manufactured product such as an optical read apparatus.

The invention is not limited only to apparatus in which, in the correctly focussed condition, the beam b is a parallel beam prior to the first passage and after the second passage through the objective system 10. The beam b originating from the record carrier and having traversed the objective system may also be a converging beam. In that case the period of the second grating will be equal to a constant factor c multiplied by the period of the first grating, the factor c being dependent on the convergence of the beam b in the correctly focussed condition. When a focus error occurs this convergence changes and again the Moiré pattern will be rotated.

What is claimed is:

1. An improved apparatus for scanning the information surface of an optical record carrier, which apparatus comprises a source of a beam of radiation, means for focusing such beam into a scanning spot on the information surface which produces reflected radiation therefrom, and a focus-error detection system producing a focus error signal signifying any deviation between the plane of focus of the radiation spot and the information surface, such improvement being characterized in that the focus-error detection system comprises:
   a first and a second optical diffraction grating arranged parallel to each other in succession in the path of the radiation reflected from the information surface of said record carrier, each grating having a constant strip period, the directions of the grating strips of the two gratings being at a small angle relative to each other so as to form an interference pattern of light and dark bands in radiation emergent from the second grating, such interference pattern having an orientation which changes in accordance with deviations between the plane of focus of said radiation spot and said information surface; and
   an assembly of radiation detecting elements arranged adjacent the second grating to receive the radiation emergent therefrom, such assembly having coordinate axes oriented at an angle relative to the orientation of said interference pattern at the location of said assembly; whereby changes in the orientation of said interference pattern change the angle thereof relative to said assembly and cause corresponding changes in output signals produced by the detecting elements of said assembly.

2. An apparatus as claimed in claim 1, wherein the radiation beam from said radiation source is divergent and the grating strip period of the second grating is equal to that of the first grating multiplied by a factor corresponding to the magnitude of such divergence.

3. An apparatus as claimed in claim 1, characterized in that the radiation emergent from the first grating forms a Talbot image at a distance therefrom and the second grating is located at such Talbot image.

4. An apparatus as claimed in claim 1 or 3, characterized in that only one of the bands of said interference pattern extends over the entire radiation-sensitive area of said radiation detecting assembly.

5. An apparatus as claimed in claim 4, characterized in that said one band of the interference pattern is a bright band thereof.

6. An apparatus as claimed in claim 1, 2, or 3, characterized in that the second grating is arranged against the radiation detecting assembly.

7. An apparatus as claimed in claim 1, 2, or 3, characterized in that the radiation detecting assembly and the second grating are constructed as a composite grating-shaped radiation detecting assembly.

* * * * *